(12) United States Patent
Kotani et al.

(10) Patent No.: US 6,670,731 B2
(45) Date of Patent: Dec. 30, 2003

(54) STEPPING MOTOR

(75) Inventors: Tsutomu Kotani, Tokyo (JP); Kazunori Mishima, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/103,728

(22) Filed: Mar. 25, 2002

(65) Prior Publication Data

US 2002/0135243 A1 Sep. 26, 2002

(30) Foreign Application Priority Data

Mar. 23, 2001 (JP) .......................... 2001-085401
Nov. 12, 2001 (JP) .......................... 2001-346564

(51) Int. Cl.[7] .............................................. H02K 37/16
(52) U.S. Cl. .............................. 310/49 R; 310/40 MM; 310/83; 310/156.01; 310/254
(58) Field of Search ......................... 310/49 R, 254, 310/40 MM, 156.01, 83

(56) References Cited

U.S. PATENT DOCUMENTS

| 4,371,821 A | | 2/1983 | Laesser et al. ............... 318/696 |
|---|---|---|---|
| 4,386,287 A | * | 5/1983 | Karasawa et al. .......... 310/49 R |
| 4,634,906 A | * | 1/1987 | Grosjean ................... 310/49 R |
| 4,700,091 A | * | 10/1987 | Wuthrich ................... 310/49 R |
| 4,782,353 A | * | 11/1988 | Ogihara et al. ............. 396/463 |
| 5,068,562 A | * | 11/1991 | Tagami et al. .............. 310/256 |
| 5,109,250 A | * | 4/1992 | Shinozaki et al. .......... 396/244 |
| 5,521,451 A | | 5/1996 | Oudet et al. ................. 310/266 |
| 5,880,551 A | | 3/1999 | Prudham ..................... 310/254 |
| 5,959,378 A | * | 9/1999 | Stechmann ............... 310/49 R |
| 6,043,574 A | | 3/2000 | Prudham ................... 310/49 R |

FOREIGN PATENT DOCUMENTS

| JP | 6-2468 | 9/1985 | |
|---|---|---|---|
| JP | 7-27826 | 8/1989 | |
| JP | 8-251902 | 9/1996 | .......... H02K/37/16 |

* cited by examiner

Primary Examiner—Burton Mullins
(74) Attorney, Agent, or Firm—Oblon, Spivak, McClelland, Maier & Neustadt, P.C.

(57) ABSTRACT

A stepping motor including a rotor having a plurality of magnetic poles, one stator base arranged near the rotor, a pair of magnetic yokes fixed on the stator base and arranged to face the magnetic poles of the rotor, a pair of excitation coils for exciting the pair of magnetic yokes respectively in response to drive pulses which have phase difference, and a pair of stator magnetic polar portions integrally formed with the stator base. The stepping motor is constructed to form magnetic paths together with the number of magnetic turns of the excitation coils without increasing the size of the magnetic yokes, thereby enhancing operations and reliability.

8 Claims, 14 Drawing Sheets

STEPPING MOTOR

BACKGROUND OF THE INVENTION

1. Field of the Invention

The present invention relates to a stepping motor downsized and capable of smooth operation, and to a stepping motor suitable for, for example, a two-phase electro-motor for a meter installed in a vehicle.

2. Description of the Related Art

In an analog-type meter installed in a vehicle for presenting analog indication, a needle is generally driven by a cross-coil motor. However, in recent years, a stepping motor has been applied in place of the cross-coil motor in order to improve directional accuracy and realize downsizing.

Specifically, as a stepping motor for an in-vehicle meter, those described in Translated National Publication of Patent Application No. Hei 11-501800, U.S. Pat. No. 6,043,574, and so on are known. These have a structure in which, as shown in FIG. 13 and FIG. 14, a rotor 112 is magnetized in a manner that its magnetic poles change along a circumferential direction, and excitation coils 116A and 116B are respectively provided on two supporting portions 114A and 114B which are stators respectively having a W-shape provided in a magnetic yoke 114. Further, in the structure, two magnetic circuits having a W-shape are composed by magnetic polar pieces 118 parts of which are communized.

On the one hand, as technique simply related to the stepping motor, disclosed in Japanese Utility model Publication No. Hei 7-27826 is that a pair of magnetic yokes 124A and 124B having a W-shape respectively mounted with excited coils 126A and 126B are separately arranged around the rotor 122, as shown in FIG. 15. On the other hand, also disclosed in Japanese Patent Publication No. Hei 4-74693, Japanese Patent Laid-open No. Hei 8-251902, and so on is technique that magnetic yokes having a U-shape are separately arranged around an outer circumference of a rotor.

In other words, according to these documents, as a general conventional stepping motor, a structure including a rotor composed of a permanent magnet in which a plurality of magnetic poles are sequentially magnetized along a circumferential direction and a pair of magnetic yokes having a U- or W-shape arranged around the rotor has been known.

Meanwhile, although reduction in current has been required for the stepping motor in recent years, space for excitation coils is restricted by the size of bobbins around which excitation coils are wound and magnetic yokes on which the bobbins are mounted (for example, the size L in FIG. 14 and FIG. 15). As a result, in order to realize the reduction in current, it becomes necessary to increase the number of turns for winding wires, decrease the wire size, and so on, but the following problems arise.

Specifically, even when the magnetic yokes having the U- or W-shape and the fixed size are used, the number of the turns of the excitation coils can be increased by making the wire size smaller, but, the smaller the wire size becomes, the greater care must be taken to avoid a break in winding the wires, which deteriorates an assembly property as well as greatly affects reliability due to a possibility of the break even after the winding.

Furthermore, there are disadvantages that, if the number of turns is increased while keeping the wire size as it is, the excitation coils become unable to be inserted into the magnetic yokes having the U- or W-shape, which results in the necessity for upsizing the magnetic yokes and also for upsizing the stepping motor, and the like.

On the other hand, although the movement of the analog indication in which the needle moves smoothly is generally required for meters, the needle does not move smoothly when the conventional stepping motor is applied to the meter because detent torque is large and only discontinuous rotational movement can be obtained in the conventional stepping motor.

SUMMARY OF THE INVENTION

Considering the above facts, it is a first object of the present invention to provide a stepping motor capable of freely changing the number of turns of an excitation coil so as to enhance assembly operations and reliability without increasing a magnetic yoke size, and it is a second object of the present invention to provide a stepping motor capable of moving smoothly.

According to one aspect of the present invention, provided is a stepping motor comprising: a rotor having a plurality of magnetic poles along its circumferential direction; one stator base arranged near the rotor; a pair of magnetic yokes fixed on the stator base and arranged to face the magnetic poles of the rotor; a pair of excitation coils mounted on the pair of magnetic yokes respectively, for exciting the pair of magnetic yokes respectively in response to drive pulses having phase difference from each other; and a pair of stator magnetic polar portions integrally formed with the stator base, for forming magnetic paths together with the magnetic yokes respectively.

With the stepping motor, the following operation is performed.

Specifically, according to the aspect, the stepping motor is structured in which the stator base is arranged near the rotor having the plurality of magnetic poles along its circumferential direction, and the pair of magnetic yokes arranged to face the magnetic poles of the rotor are fixed on the stator base.

Further, according to the aspect, as the drive pulses having the phase difference from each other are applied to the pair of excitation coils which are respectively mounted on the pair of magnetic yokes, the pair of excitation coils excite the pair of magnetic yokes respectively. Then, the pair of stator magnetic polar portions, which are integrally formed with the stator base and separated from each of the magnetic yokes, form the magnetic paths together with the magnetic yokes and are magnetized when the pair of magnetic yokes are excited.

In other words, according to the aspect, since the stator magnetic polar portions which form the magnetic paths together with the magnetic yokes are formed separately from the magnetic yokes, the magnetic yokes can be formed in, for example, an I-, T-, or J-shape, which does not restrict the size of the excitation coils.

As a result, different from the magnetic yokes having the U- or W-shape, the restriction on the shape of the magnetic yokes in arranging the excitation coils is reduced, and the number of turns of the excitation coils can be easily increased. Therefore, flexibility of resistance values of the excitation coils applied to the stepping motor according to this aspect greatly increases, which also improves flexibility in designing a shape of the stepping motor.

As described above, according to this aspect, it becomes possible to freely change the size of the excitation coils without increasing the size of the magnetic yokes, and assembly operations and reliability of the stepping motor can be enhanced while decreasing the size of the stepping motor.

Moreover, according to this aspect, since the stator base and the pair of stator magnetic polar portions are integrally formed, the stepping motor can be assembled while positioning the magnetic yokes, which are fixed to the stator base, and the stator magnetic polar portions easily with high precision. Thus, the stator magnetic polar portions can be manufactured more easily by presswork and the like, which can reduce the manufacturing cost as well as forms an accurate magnetic circuit.

Meanwhile, as an example of the aspect, the stepping motor can be considered to have a structure in which, when an angle between the pair of magnetic yokes around a center of the rotor is α, angles between the magnetic yokes and the stator magnetic polar portions around the center of the rotor are β1 and β2, and an angle between the pair of stator magnetic polar portions around the center of the rotor is γ, and if the number of magnetic poles of the rotor is N, K is an integer, a is an odd number, and b is 0 or 1, each of the angle α and angles β1 and β2 is less than 180° and obtained from formulas of $$\alpha = (K+0.5) \times 360/N$$
$$\beta1, \beta2 = (a \pm b/4) \times 360/N.$$

However, in a case where a value of C is obtained from a formula of C=γ×N/360 is an integer, detent torque increases. Therefore, the angles are controlled so that C is not an integer.

In other words, it can be considered that the pair of magnetic yokes are fixed to the stator base in positions under the above-described conditions and the stator magnetic polar portions are arranged in positions under the above-described conditions with respect to the magnetic yokes. As a result, owing to the positions of the pair of magnetic yokes and the pair of stator magnetic polar portions, magnetic forces given from the magnetic poles of the rotor when the excitation coils are not energized cancel out each other so that the detent torque is reduced.

As described above, in this example, similarly to the above description, it becomes possible to freely change the size of the excitation coils without increasing the size of the magnetic yokes, and assembly operations and reliability of the stepping motor can be enhanced while decreasing the size of the stepping motor, as well as the detent torque is reduced so that the rotor moves smoothly.

As a result, if the stepping motor according to this example is applied to the meter, the needle moved by the stepping motor operates smoothly.

According to another aspect of the present invention, provided is a stepping motor having a structure in which permeability of material composing the pair of magnetic yokes is higher than permeability of material composing the stator base, in addition to the structure similar to that in the aforesaid aspect of the present invention.

With the stepping motor, the following operation is performed.

Specifically, according to the aspect, although the operation is the same as that in the aforesaid aspect of the present invention, a large magnetic force can be generated with a small current owing to the above-described relation of permeability, which allows the stepping motor to function optimally. Further, it becomes possible to use high-permeability material whose cost is generally high only in the minimum required part and the manufacturing cost for the stepping motor is further reduced.

According to still another aspect of the present invention, provided is a stepping motor having a structure in which a case body for forming an outer frame of the stepping motor is included and a stator fixing hook is formed in the case body so that the stator base is fixed to the case body by the stator fixing hook, in addition to the structure similar to that in the aforesaid aspect of the present invention.

With the stepping motor, the following operation is performed.

Specifically, according to the aspect, although the operation is the same as that in the aforesaid aspect of the present invention, in assembling the stepping motor, the stator base engages with the stator fixing hook so as to be fixed to the case body only by pushing the stator base into the case body. Therefore, the manufacturing steps are simplified and the manufacturing cost for the stepping motor is further reduced.

DETAILED DESCRIPTION OF THE PREFERRED EMBODIMENTS

Hereinafter a first embodiment of a stepping motor according to the present invention will be explained with reference to the drawings in order to clarify the present invention.

Figure 1:
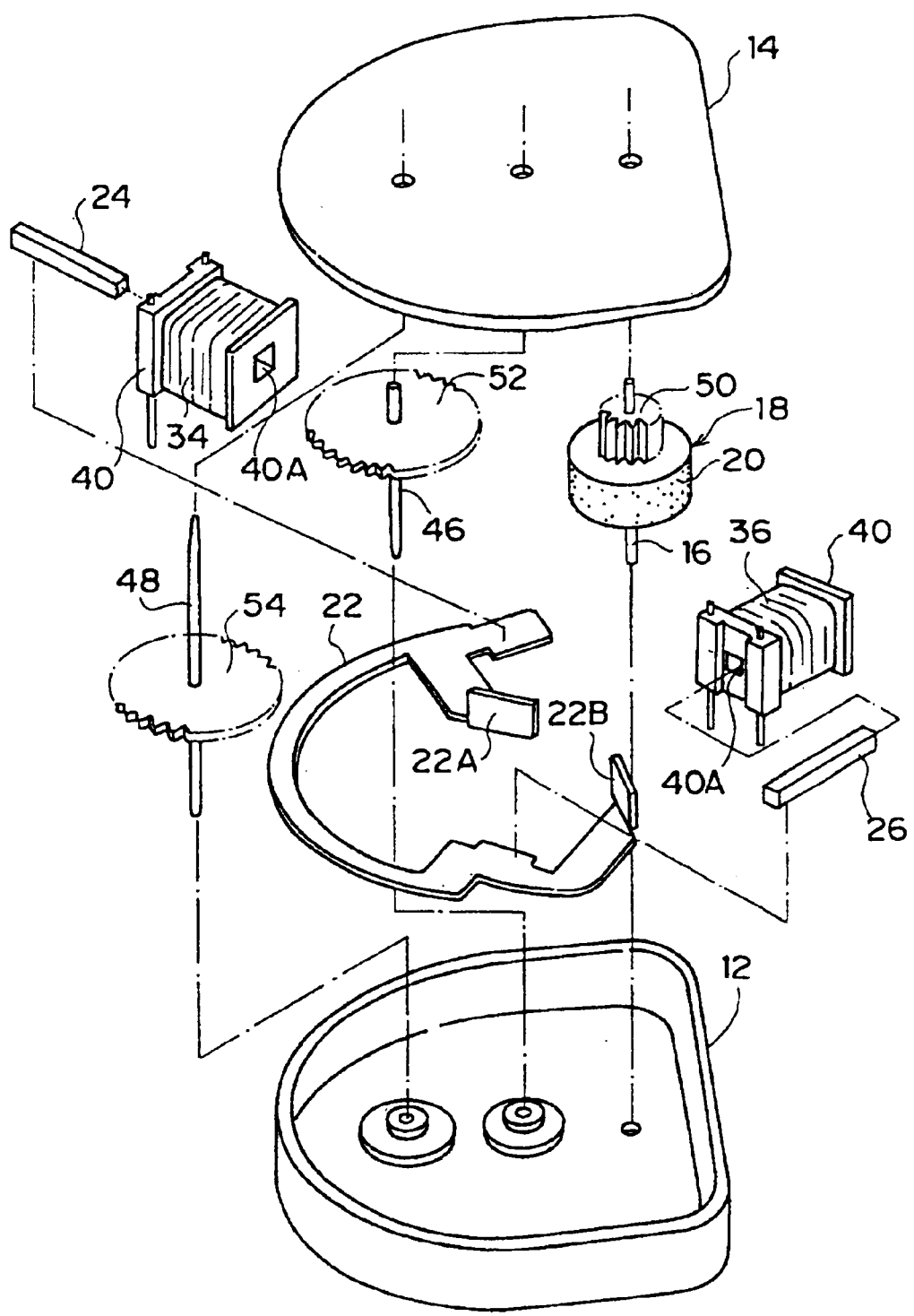
FIG. 1 is an exploded perspective view of a stepping motor according to a first embodiment of the present invention.
Figure 2:
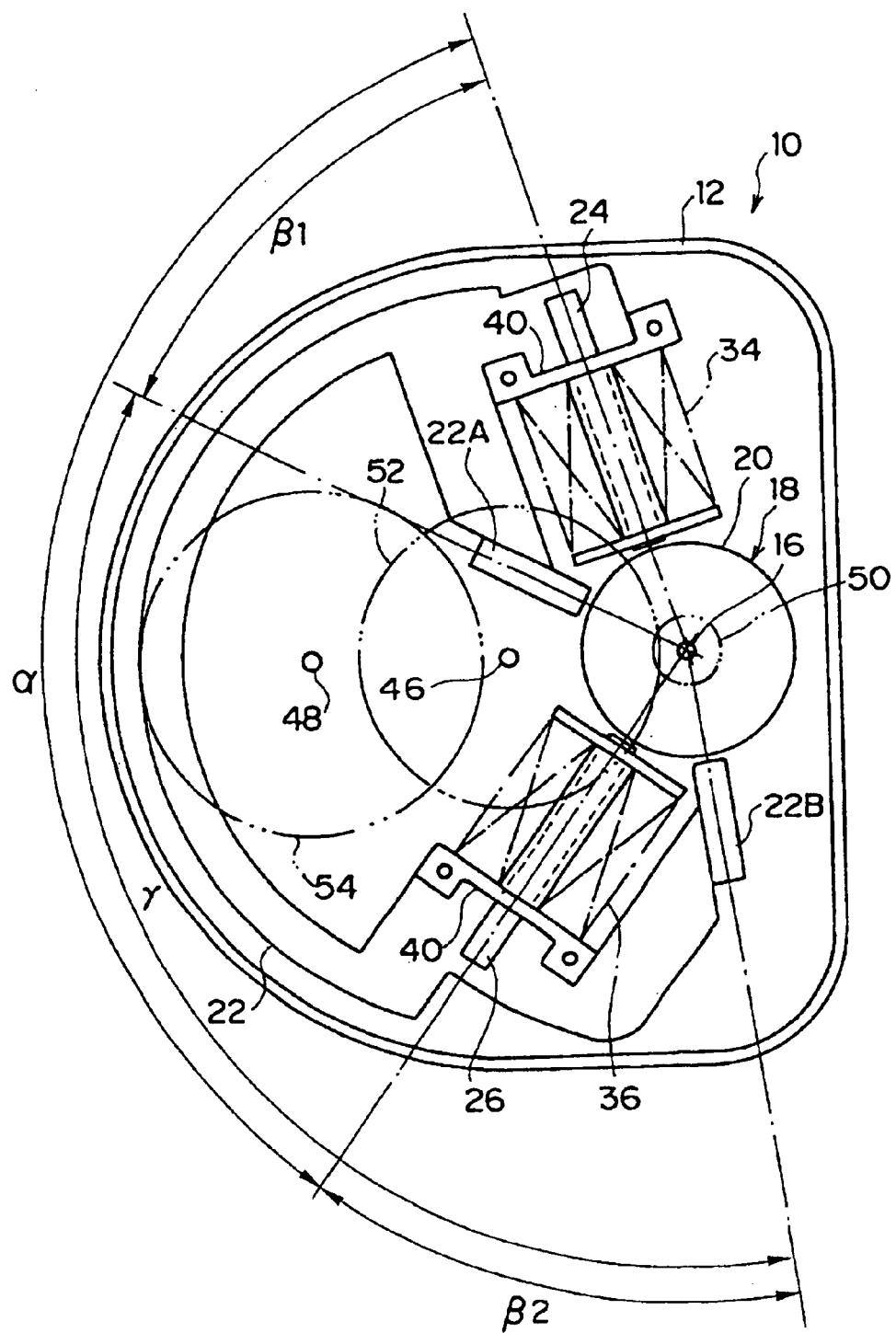
FIG. 2 is a plan view showing the stepping motor according to the first embodiment of the present invention in a state that a cover and gears are removed therefrom.
Figure 3:
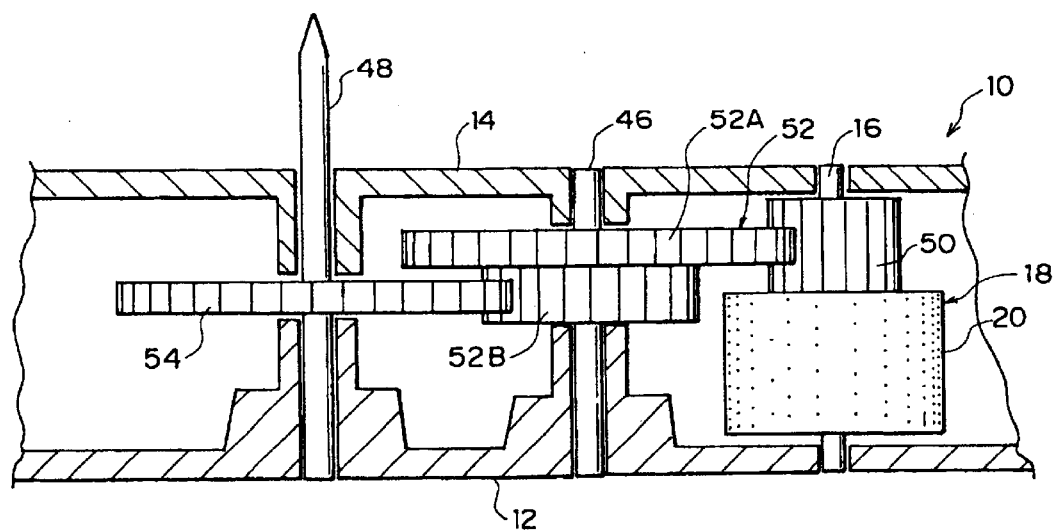
FIG. 3 is a sectional view of the stepping motor according to the first embodiment of the present invention.

As shown in FIG. 1 to FIG. 3, a case body 12 made of a synthetic resin composes an outer frame of a stepping motor 10 according to the first embodiment of the present invention, and a cover 14 which is also made of the synthetic resin composes a cover of the case body 12. Ends of a supporting axis 16 are rotatably supported by parts of the cover 14 and the case body 12, which correspond to each other, respectively so that the supporting axis 16 is bridged therebetween.

On the supporting axis 16, a rotor 18 whose center portion is made of a resin and having a cylindrical permanent magnet 20 arranged on its outer circumferential side is mounted. In this permanent magnet 20, a plural, for example, 10 magnetic poles are formed at regular intervals along a circumferential direction. In other words, the permanent magnet 20 has totally 10 magnetic poles in which 5 north poles and 5 south poles are formed adjacent to each other.

In a part of a bottom of the case body 12 near the outer circumferential side of the rotor 18, a stator base 22 made of ferromagnetic material such as iron and formed in an arcuate shape is fixed in a manner that its one end side sandwiches the rotor 18.

Further, a pair of magnetic yokes 24 and 26 each of which is formed in a linear shape pass through through holes 40A of bobbins 40 respectively. Thus, a pair of coils 34 and 36, which are excitation coils wound around the bobbins 40 are mounted on the pair of magnetic yokes 24 and 26 so that the pair of coils 34 and 36 are fixed to the pair of magnetic yokes 24 and 26.

Base end sides of the pair of magnetic yokes 24 and 26 are fixed to the stator base 22 and front end sides of the pair of magnetic yokes 24 and 26 are arranged to face the rotor 18. This causes the pair of magnetic yokes 24 and 26 to be arranged in a manner that their longitudinal directions extend along directions orthogonal to an axis direction of the rotor 18 so that a magnetic path can be formed in the stator base 22. It should be noted that an angle $\alpha$ which is shown in FIG. 2 around the center of the rotor 18 between the pair of magnetic yokes 24 and 26 is an angle of 126°.

Meanwhile, a pair of stator magnetic polar portions 22A and 22B are provided on an inner circumferential side of the stator base 22 in a manner that protruding portions which protrude in directions orthogonal to the axis direction of the rotor 18 at the inner circumferential side respectively are bent upward in a vertical direction with respect to a surface of the stator base 22.

Accordingly, the pair of stator magnetic polar portions 22A and 22B are integrally formed with the stator base 22 and separately structured from the magnetic yokes 24 and 26. The stator magnetic polar portion 22A is arranged in a manner that an angle $\beta 1$ shown in FIG. 2, around the center of the rotor 18 between the magnetic yoke 24 and the stator magnetic polar portion 22A is an angle of 45°. Further, the stator magnetic polar portion 22B is arranged in a manner that an angle $\beta 2$ shown in FIG. 2 around the center of the rotor 18 between the magnetic yoke 26 and the stator magnetic polar portion 22B is an angle of 45°. As a result, an angle $\gamma$ shown in FIG. 2 around the center of the rotor 18 between the pair of stator magnetic portions 22A and 22B is also 126°.

Thus, the pair of magnetic yokes 24 and 26 and the pair of stator magnetic polar portions 22A and 22B are arranged radially around the center of the rotor 18. Moreover, the aforesaid pair of coils 34 and 36 are connected to a not-shown control circuit, and currents are supplied from the control circuit the respective coils. Incidentally, the currents respectively include drive pulses which are generated at a predetermined frequency and have predetermined phase difference from each other.

In response to these drive pulses, the pair of coils 34 and 36 excite the pair of magnetic yokes 24 and 26 respectively, and in this case, the stator magnetic polar portion 22A and the magnetic yoke 24 compose a magnetic path while the stator magnetic polar portion 22B and the magnetic yoke 26 compose a magnetic path. As a result, the rotor 18 rotates by the number of pulses as the pair of magnetic yokes 24 and 26 and the pair of stator magnetic polar portions 22A and 22B are sequentially magnetized.

On the other hand, on the rotor 18, a prime gear 50 made of resin material is integrally formed with the center portion of the rotor 18. Further, an output gear 54 to which an output axis 48 is press-fitted is rotatably supported by the case body 12. Furthermore, a middle gear 52 composed of a large gear 52A and a small gear 52B shown in FIG. 3 is rotatably fitted to a supporting axis 46 which is mounted to the case body 12.

In other words, the middle gear 52 is rotatably arranged between the prime gear 50 and the output gear 54. The prime gear 50 is engaged with the middle gear 52 by the large gear 52A of the middle gear 52 and the output gear 54 is engaged with the middle gear 52 by the small gear 52B of the middle gear 52 so that the rotation speed of the rotor 18 is reduced.

Next, the assembly of the stepping motor 10 according to the embodiment will be explained.

The stator base 22 is manufactured by presswork or the like and the cover 14, case body 12, bobbins 40, and the resin material part of the rotor 18 are respectively manufactured by injection molding or the like, in advance. Further, the rotor 18 is fitted to the supporting axis 16 and the permanent magnet 20 is mounted on the outer circumferential side of the rotor 18. Aside from this, the permanent magnetic 20 has been magnetized in a manner that it has the plural magnetic poles at regular intervals along the circumferential direction. Incidentally, the stator magnetic polar portions 22A and 22B are bent when the stator base 22 is subjected to presswork or the like.

Thereafter, the pair of magnetic yokes 24 and 26 are fixed at predetermined positions in the stator base 22 by welding or the like. Then, the magnetic yokes 24 and 26 pass through the through holes 40A of the pair of bobbins 40 around which the coils 34 and 36 are wound respectively and the stator base 22 is mounted on the bottom of the case body 12. Thus, the coils 34 and 36 are installed on the stator base 22 in a state that the pair of magnetic yokes 24 and 26 penetrate the coils 34 and 36 respectively.

Further, by installing the metallic supporting axis 16, on which the rotor 18 is mounted, to the case body 12 from an upper part of FIG. 1, one end side of the supporting axis 16 becomes in a state of being rotatably supported by the case body 12. Thus, the rotor 18 is rotatably mounted on the case body 12.

Furthermore, the output gear 54 to which the output axis 48 is press-fitted is rotatably mounted on the case body 12. Thereafter, the middle gear 52 for reducing the rotation speed of the rotor 18 is rotatably fitted to the supporting axis 46 and the supporting axis 46 is mounted on the case body 12. Accordingly, the middle gear 52 is made to engage with the prime gear 50, which has been integrally formed when the rotor 18 is injection molded, and the output gear 54.

Finally, the cover 14 is mounted on an upper face of the case body 12 in which the parts are contained as described above while a not-shown protruding portion formed on the case body 12 is fitted with the cover 14, and the cover 14 is fixed to the case body 12 with a screw or the like so that the stepping motor 10 is completed.

Subsequently, the operation of the stepping motor 10 according to the embodiment will be explained.

The stepping motor 10 according to the embodiment has a structure in which the stator base 22 is arranged near the rotor 18 having the plural magnetic poles along the circumferential direction, and the pair of magnetic yokes 24 and 26 arranged to face the magnetic poles of the rotor 18 are fixed on the stator base 22 so that the magnetic paths can be formed respectively.

Further, the pair of coils 34 and 36 excite the pair of magnetic yokes 24 and 26 respectively as the drive pulses having the phase difference from each other are imposed from the control circuit to the pair of coils 34 and 36 which are respectively mounted on the pair of magnetic yokes 24 and 26. Then, the pair of stator magnetic polar portions 22A and 22B, which are integrally formed with the stator base 22 and separated from each of the magnetic yokes 24 and 26, form the magnetic paths together with the magnetic yokes 24 and 26 and become magnetized.

As a result, for example, if currents including drive pulses having phase difference are supplied to the coils 34 and 36, the following happens.

Specifically, the magnetic path is formed from the magnetic yoke 24 through the stator base 22 to the stator magnetic polar portion 22A, which becomes a south pole or a north pole. Having phase difference from this, the magnetic path is formed from the magnetic yoke 26 through the stator base 22 to the stator magnetic polar portion 22B, which becomes a south pole or a north pole.

Accordingly, the magnetic paths cooperate with the magnetic poles of the permanent magnet 20 of the rotor 18 to cause the rotor 18 to perform stepping operation in which the rotor 18 rotates sequentially, and the stepping operation is transmitted to the output gear 54 while its speed is reduced at the middle gear 52 and outputted to the outside of the stepping motor 10.

In this embodiment, since the stator magnetic polar portions 22A and 22B, which form the magnetic paths together with the magnetic yokes 24 and 26, are formed separately with the magnetic yokes 24 and 26, the magnetic yokes 24 and 26 have, for example, an I- or T-shape, which does not restrict the size of the coils 34 and 36.

As a result, different from conventional magnetic yokes having a U- or W-shape, the restriction on the arrangement of the coils 34 and 36 is reduced and the coils 34 and 36 can be wound by desirable turns without making their wire size smaller. Therefore, currents to be supplied to the coils 34 and 36 are not restricted by the size of the magnetic yokes 24 and 26.

Accordingly, flexibility of resistance values of the coils 34 and 36 which are applied to the stepping motor 10 according to the embodiment greatly increases, which also improves flexibility in designing a shape of the stepping motor 10.

As described above, in this embodiment, the size of the coils 34 and 36 can be freely changed without increasing the size of the magnetic yokes 24 and 26, which can enhance assembly operations and reliability of the stepping motor 10 while decreasing the size of the stepping motor 10.

Since the shape of the magnetic yokes 24 and 26 is simple, process yields are improved. In addition, since the shape of the magnetic yokes 24 and 26 is simple and the assembly can be mechanized, it becomes also possible to reduce the manufacturing cost.

Aside from this, in this embodiment, since the magnetic yokes 24 and 26 are formed separately from the stator base 22, it becomes unnecessary to make material of the magnetic yokes 24 and 26 the same as material of the stator base 22 and stator magnetic polar portions 22A and 22B. Therefore, it becomes possible to change motor characteristics by changing material of only the magnetic yokes 24 and 26 into material which has an excellent magnetic characteristic without changing material of a ferromagnetic material plate composing the stator base 22 and stator magnetic polar portions 22A and 22B, and so on. Accordingly, motors having the same shape and different characteristics can be manufactured, which realizes diversification of products.

Specifically, in this embodiment, permeability of the material composing the pair of magnetic yokes 24 and 26 is set as higher than permeability of the material composing the stator base 22.

Thus, not only the diversification of the products can be realized but also large magnetic force can be generated with a small current due to the above-described relation of the permeability, which allows the stepping motor 10 to function optimally. Further, it becomes possible to use high-permeability material, which costs high in general, only in the minimum necessary parts and the manufacturing cost of the stepping motor 10 can be reduced.

Meanwhile, in this embodiment, since the stator base 22 and the pair of stator magnetic polar portions 22A and 22B are integrally formed, the stepping motor 10 can be assembled while positioning the magnetic yokes 24 and 26, which are fixed to the stator base 22, and the stator magnetic polar portions 22A and 22B easily with high precision.

As a result, by manufacturing the stator magnetic polar portions 22A and 22B easily with high precision by presswork or the like, the yields can be improved and the manufacturing cost can be reduced as well as an accurate magnetic circuit can be formed.

On the other hand, in this embodiment, the rotor 18 has 10 poles and the angle α between the pair of magnetic yokes 24 and 26 around the center of the rotor 18 shown in FIG. 2 is 126°. In addition, the angle β1 between the magnetic yoke 24 and the stator magnetic polar portion 22A around the center of the rotor 18 and the angle β2 between the magnetic yoke 26 and the stator magnetic polar 22B around the center of the rotor 18 are 45° respectively. Accordingly, each of the angle α and angles β1 and β2 is equal to or less than 180°.

The angle α and angles β1 and β2 coincide with values obtained from the following formulas when the number N of magnetic poles of the rotor 18 is 10, K is 3 as an integer, a is 1 as an odd number, and b is 1 out of 0 and 1.

$$\alpha = (K+0.5) \times 360/N$$

$$\beta 1, \beta 2 = (\pm b/4) \times 360/N$$

Furthermore, in this embodiment, the angle γ between the pair of stator magnetic polar portions 22A and 22B around the center of the rotor 18 is 126°, and a value of C obtained from a formula $$C = \gamma \times N/360 \text{ is } 3.5.$$

Therefore, since the value of C is not an integer, the above-described angle α and angles β1 and β2 could be appropriate. In other words, the angles are controlled so that C is not an integer.

In other words, in this embodiment, the pair of magnetic yokes 24 and 26 are fixed in the positions under the above-described conditions on the stator base 22 as well as the pair of stator magnetic polar portions 22A and 22B are arranged in the positions under the above-described conditions with respect to the pair of magnetic yokes 24 and 26.

As a result, in the case where, for example, the angle α is 126° and each of the angles β1 and β2 is 45° as described above, magnetic forces given from magnetic poles of the rotor 18 cancel out each other when the coils 34 and 36 are not energized because of the positions of the pair of magnetic yokes 24 and 26 and the pair of stator magnetic polar portions 22A and 22B, which reduces detent torque.

More specifically, when the magnetic yoke 24 comes to the position facing a center of any of the magnetic poles of the rotor 18, the other magnetic yoke 26 and stator magnetic polar portions 22A and 22B are not positioned to face centers of the magnetic poles of the rotor 18. When the magnetic yoke 26 comes to the position facing a center of any of the magnetic poles of the rotor 18, the other magnetic yoke 24 and stator magnetic polar portions 22A and 22B are not positioned to face centers of the magnetic poles of the rotor 18.

As described above, since the detent torque is reduced and the rotor 18 operates smoothly in this embodiment, if the stepping motor 10 according to this embodiment is applied to meters, a needle which is moved by the stepping motor 10 operates smoothly.

Next, the rotational operation of the stepping motor 10 according to the embodiment will be explained in detail.

Figure 4:
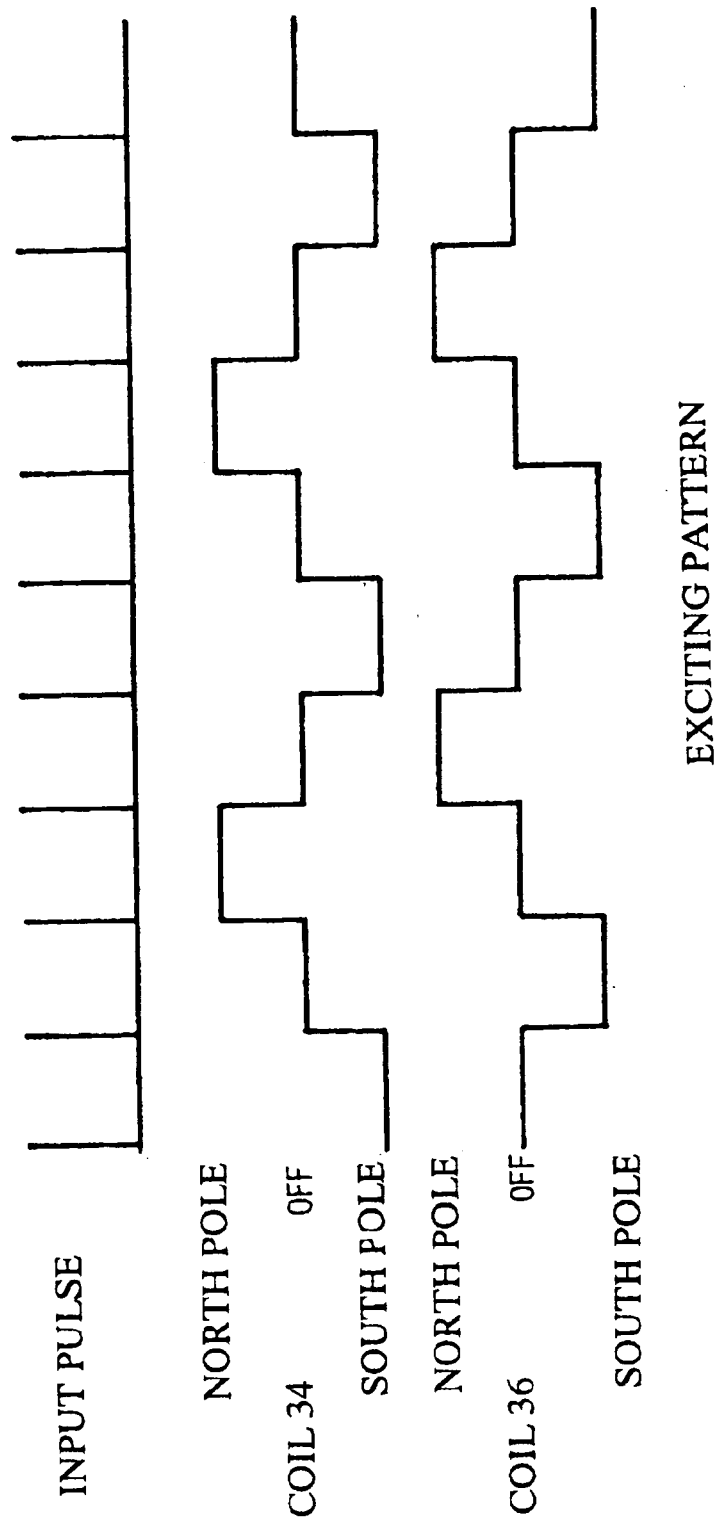
FIG. 4 is an operational chart showing the relation between input pulses inputted to the stepping motor according to the first embodiment of the present invention and magnetization of coils.
Figure 5A:
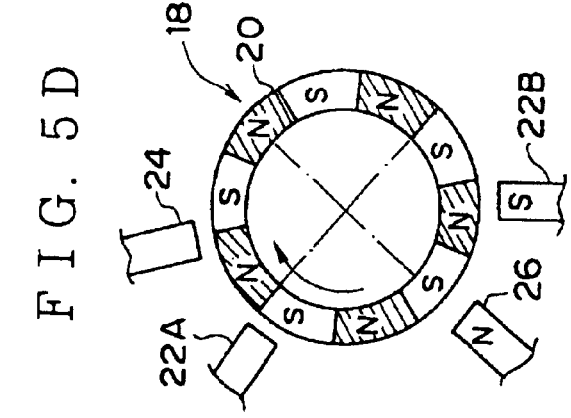
FIG. 5A is a conceptual view showing the first relation between magnetic poles of a permanent magnet, and, magnetic yokes and stator magnetic polar portions of the stepping motor according to the first embodiment of the present invention.

First, as shown in FIG. 4, as an input pulse is inputted to the control circuit, a pulse-formed current which is a drive pulse is supplied to the coil 34 from the control circuit. At this time, as shown in FIG. 5A, the magnetic yoke 24 mounted with the coil 34 becomes a south pole and attracts a north pole of the permanent magnet 20 fixed to the rotor 18.

On this occasion, the stator magnetic polar portion 22A becomes a north pole although its magnetic force is smaller than that of the magnetic yoke 24, and the stator magnetic polar portion 22A is positioned to face a south pole of the permanent magnet 20 in a state of deviating from a center of the south pole. Further, since the magnetic yoke 26 mounted with the coil 36 is positioned at the angle of 126° with respect to the magnetic yoke 24 in advance, the magnetic yoke 26 is positioned to face to the midpoint position between a north pole and a south pole of the permanent magnet 20. Moreover, the stator magnetic polar portion 22B is also positioned to face the permanent magnet 20 in a state of deviating from a center of its magnetic pole.

At this time, since the pair of stator magnetic polar portions 22A and 22B attract the respective facing south poles of the rotor 18 with forces equal to each other, which generates forces to rotate the rotor 18 in directions opposite to each other, the opposing rotational forces are controllably balanced so that the smooth rotation of the rotor 18 becomes possible.

Figure 5B:
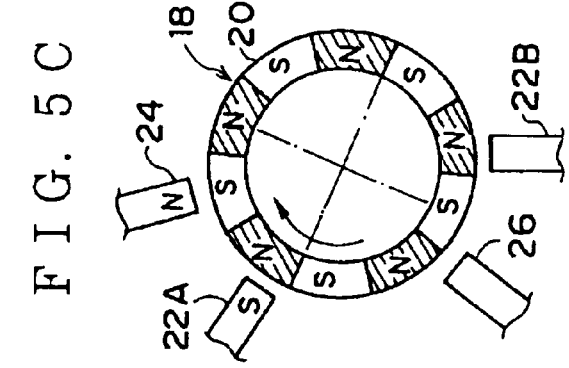
FIG. 5B is a conceptual view showing the relation between the magnetic poles and the magnetic yokes and stator magnetic polar portions when the permanent magnet of the stepping motor of the same rotates 18°.

Next, as shown in FIG. 4, as the input pulse is inputted to the control circuit again similarly to the above description, the magnetic yoke 26 mounted with the coil 36 becomes a south pole as shown in FIG. 5B. Thus, the magnetic yoke 26 attracts the north pole of the rotor 18, and the rotor 18 rotates by 18° in a clockwise direction in FIG. 5B.

Also at this time, the stator magnetic polar portion 22B becomes a north pole although the magnetic force is smaller than that of the magnetic yoke 26, and the stator magnetic polar portion 22B is positioned to face a south pole of the permanent magnet 20 in a state of deviating from the center of the south pole. Further, since the magnetic yoke 24 is positioned at the angle of 126° with respect to the magnetic yoke 26 in advance, the magnetic yoke 24 is positioned to face the midpoint position between the north pole and the south pole of the permanent magnet 20. In addition, the stator magnet polar portion 22A is also positioned to oppose the magnetic pole of the permanent magnet 20 in a state of deviating from its center.

Therefore, also on this occasion, the pair of stator magnetic polar portions 22A and 22B attract the south pole and north pole of the rotor 18 respectively, similar to the above description, and forces are generated to rotate the rotor 18 in the directions opposite to each other, thereby controllably balancing the opposing rotational forces so that the smooth rotation of the rotor 18 becomes possible.

Figure 5C:
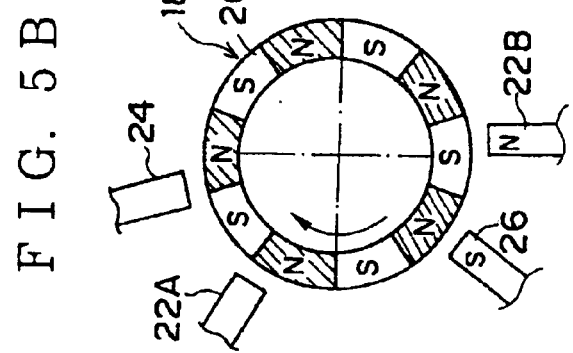
FIG. 5C is a conceptual view showing the relation between the magnetic poles and the magnetic yokes and stator magnetic polar portions when the permanent magnet of the stepping motor of the same further rotates 18°.

As shown in FIG. 4, as the input pulse is inputted to the control circuit again similarly to the above description, the magnetic yoke 24 of the coil 34 becomes a north pole as shown in FIG. 5C. Thus, the magnetic yoke 24 attracts the south pole of the rotor 18, and the rotor 18 further rotates by 18° in the clockwise direction. Also on this occasion, the rotational forces given to the rotor 18 are canceled between the pair of stator magnetic polar portions 22A and 22B, similarly to the aforesaid case in FIG. 5A although the magnetic poles are reversed, and the smooth rotation of the rotor 18 becomes possible.

Figure 5D:
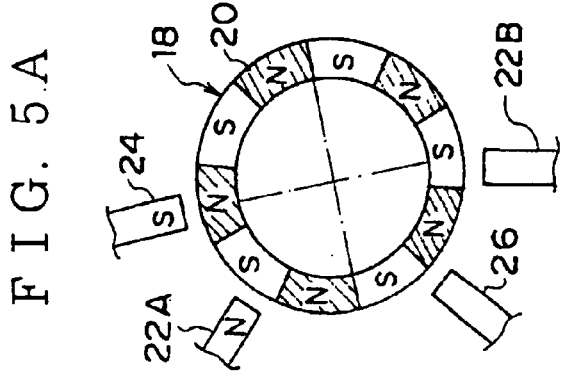
FIG. 5D is a conceptual view showing the relation between the magnetic poles and the magnetic yokes and stator magnetic polar portions when the permanent magnet of the stepping motor of the same still further rotates 18°.

Further, as shown in FIG. 4, as the input pulse is inputted to the control circuit again similarly to the above description, the magnetic yoke 26 of the coil 36 becomes a north pole as shown in FIG. 5D. Thus, the magnetic yoke 26 attracts the south pole of the rotor 18, and the rotor 18 further rotates by 18° in the clockwise direction. Also on this occasion, the rotational forces given to the rotor 18 are canceled between the pair of stator magnetic polar portions 22A and 22B, similarly to the aforesaid case in FIG. 5B although the magnetic poles are reversed, and the smooth rotation of the rotor 18 becomes possible.

Thereafter, the coil 34 and coil 36 are excited in the above order and the rotor 18 smoothly rotates in sequence in the same direction. Incidentally, if the order for exciting the coil 34 and coil 36 is changed, the rotational direction of the rotor 18 can be reversed.

Meanwhile, as variations of this embodiment, the following cases can be considered.

Figure 6A:
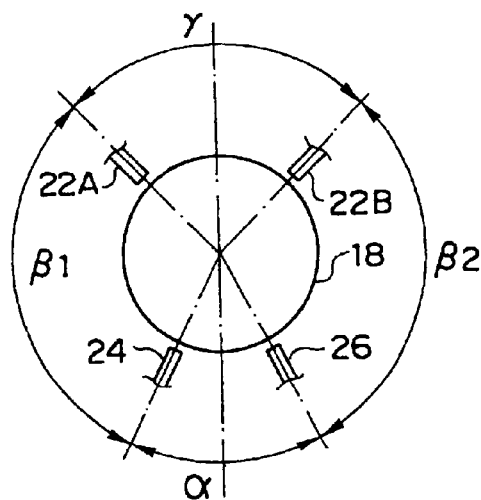
FIG. 6A is a conceptual view showing the relation between the magnetic yokes and the stator magnetic polar portions of a first variation of the stepping motor according to the first embodiment of the present invention.

A first variation shown in FIG. 6A has a structure in which the number N of the magnetic poles of the rotor 18 is 10, K is 1 as an integer, a is 3 as an odd number, and b is 0 out of 0 and 1, which means that the angle α is 54° and each of the angles β1 and β2 is 108° according to the aforesaid formulas.

In this case, since the angle γ is 90° and C does not become an integer according to the formula of C=γ×N/360, the angle α and the angles β1 and β2 could be appropriate angles.

Figure 6B:
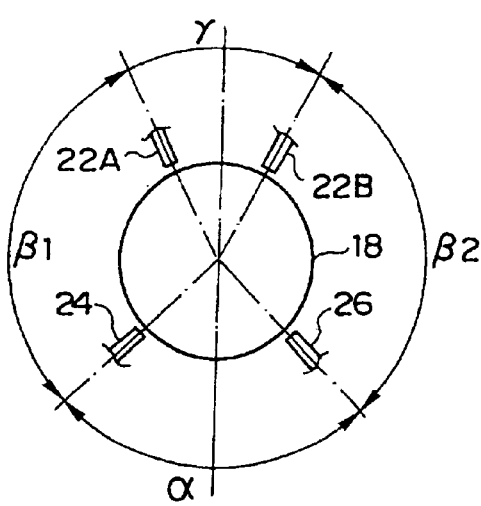
FIG. 6B is a conceptual view showing the relation between the magnetic yokes and the stator magnetic polar portions of a second variation of the stepping motor according to the first embodiment of the present invention.

A second variation shown in FIG. 6B has a structure in which the number N of the magnetic poles of the rotor 18 is 10, K is 2 as an integer, a is 3 as an odd number, and b is 0 out of 0 and 1, which means that the angle α is 90° and each of the angles β1 and β2 is 108° according to the aforesaid formulas.

In this case, since the angle γ is 54° and C does not become an integer according to the formula of C=γ×N/360, similarly, the angle α and the angles β1 and β2 could be appropriate angles.

Figure 6C:
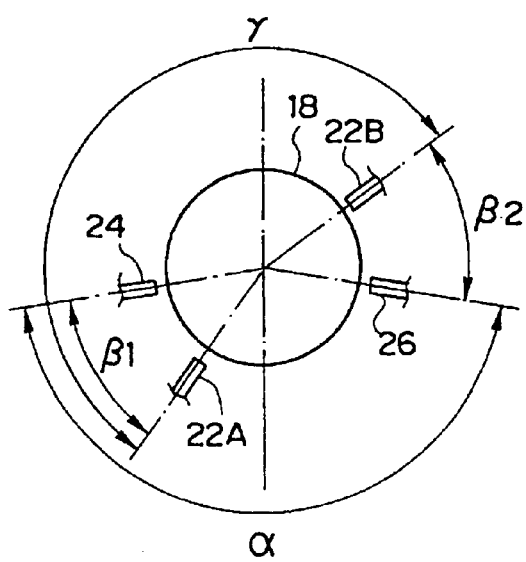
FIG. 6C is a conceptual view showing the relation between the magnetic yokes and the stator magnetic polar portions of a third variation of the stepping motor according to the first embodiment of the present invention.

A third variation shown in FIG. 6C has a structure in which the number N of the magnetic poles of the rotor 18 is 10, K is 4 as an integer, a is 1 as an odd number, and b is 1 out of 0 and 1, which means that the angle α is 162° and each of the angles β1 and β2 is 45° according to the aforesaid formulas.

In this case, since the angle γ is 198° and C does not become an integer according to the formula of C=γ×N/360, similarly, the angle α and the angles β1 and β2 could be appropriate angles.

Figure 6D:
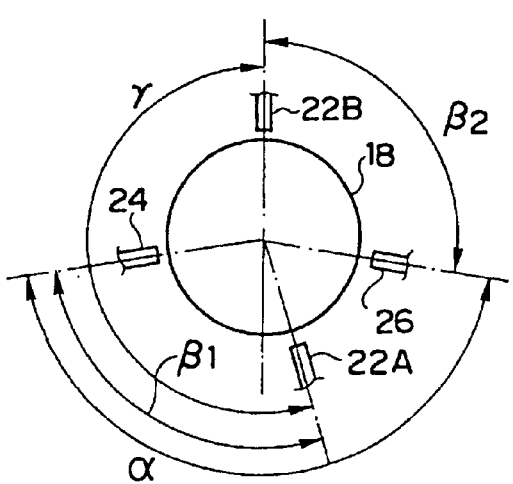
FIG. 6D is a conceptual view showing the relation between the magnetic yokes and the stator magnetic polar portions of a fourth variation of the stepping motor according to the first embodiment of the present invention.

A fourth variation shown in FIG. 6D has a structure in which the number N of the magnetic poles of the rotor 18 is 10, K is 4 as an integer, a is 3 as an odd number, and b is 1 out of 0 and 1, which means that the angle α is 162° and each of the angles β1 and β2 is 99° according to the aforesaid formulas.

In this case, since the angle γ is 198° and C does not become an integer according to the formula of C=γ×N/360, similarly, the angle α and the angles β1 and β2 could be appropriate angles.

Incidentally, in the variations in FIG. 6A and FIG. 6B out of the variations shown in FIG. 6A to FIG. 6D, since each of the pair of stator magnetic polar portions 22A and 22B is arranged beyond a range of the angle α, a value of the angle γ is obtained by a formula of γ=(360−α)−β1−β2. Further, in the variations in FIG. 6C and FIG. 6D, since the stator magnetic portion 22A is arranged in the range of the angle α, the value of the angle γ is obtained by a formula of γ=(360−α)+β1−β2.

Subsequently, a second embodiment of the stepping motor according to the present invention will be explained with reference to FIG. 7. It should be noted that the same numerals and symbols are given to the same parts as those explained in the first embodiment and the overlapping explanations thereof will be omitted.

Figure 7:
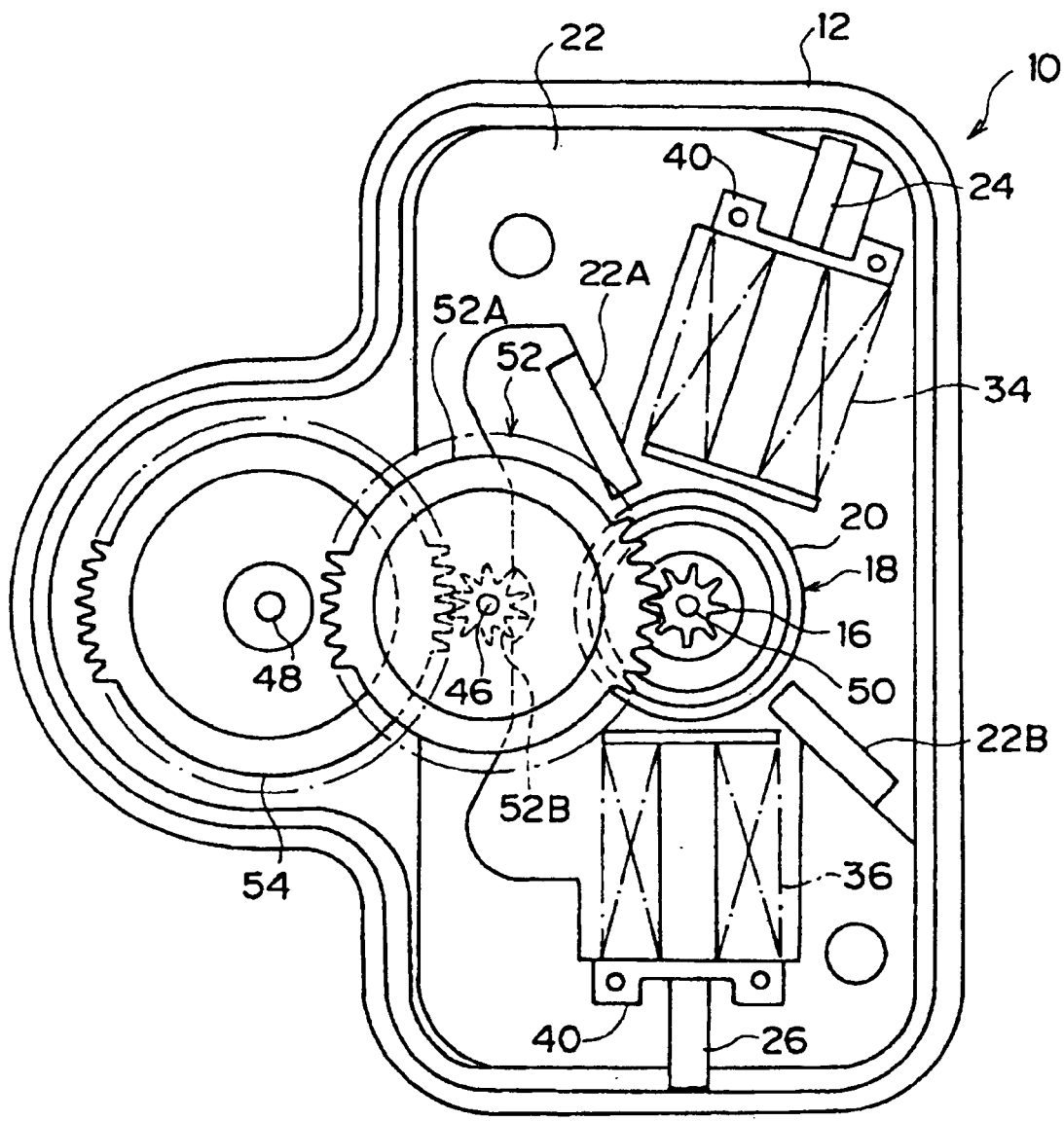
FIG. 7 is a plan view showing a stepping motor according to a second embodiment of the present invention in a state that a cover is removed therefrom.

Specifically, according to this embodiment, by arranging the magnetic yokes 24 and 26 and the stator magnetic polar portions 22A and 22B as shown in FIG. 7, the same operation and effects as those in the first embodiment can be realized, although the stator base 22 is formed in a rectangular shape. Further, according to the embodiment, the number of turns of the coils 34 and 36 can become freely changed without being obstructed by gears and the like, which further improves the flexibility in designing the shape of the stepping motor 10.

Next, a third embodiment of the stepping motor according to the present invention will be explained with reference to FIG. 8 to FIG. 12. It should be noted that the same numerals and symbols are given to the same parts as those explained in the first embodiment and the overlapping explanations thereof will be omitted.

Figure 8:
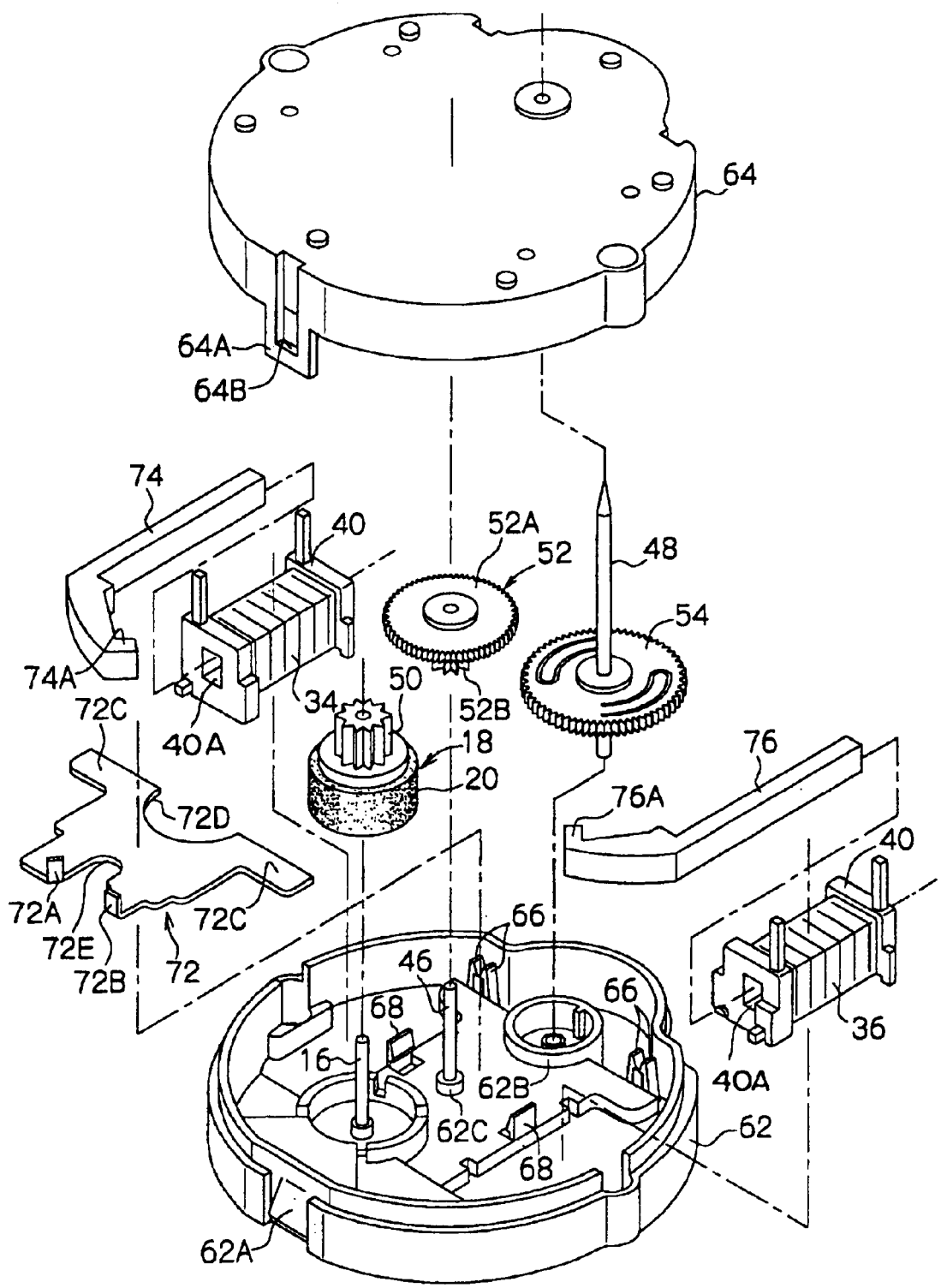
FIG. 8 is an exploded perspective view of a stepping motor according to a third embodiment of the present invention.

As shown in FIG. 8, a case body 62 having a substantially circular shape and made of a synthetic resin composes an outer frame of a stepping motor 60 according to this embodiment, and a cover 64 which is also having a substantially circular shape and made of the synthetic resin composes a cover to close an open end of the case body 62. In outer circumferential parts of the cover 64, a plurality (in FIG. 8, shown only one) of engaging pieces 64A, which are tongue-shaped engaging portions, are provided to protrude downward respectively. Further, a plurality (in FIG. 8, shown only one) of connecting hooks 62A provided in outer circumferential parts of the case body 62 and holes 64B formed by boring the engaging pieces 64A engage with each other, thereby allowing the cover 64 to be mounted on the case body 62.

In addition, as shown in FIG. 8 to FIG. 12, the ends of the supporting axis 16, which is the same as that in the first embodiment, are supported by parts of the cover 64 and case body 62, which correspond to each other, and the supporting axis 16 is bridged therebetween. On the supporting axis 16, similarly to the first embodiment, the rotor 18 having the cylindrical permanent magnet 20 arranged on its outer circumferential side is rotatably mounted.

Figure 9:
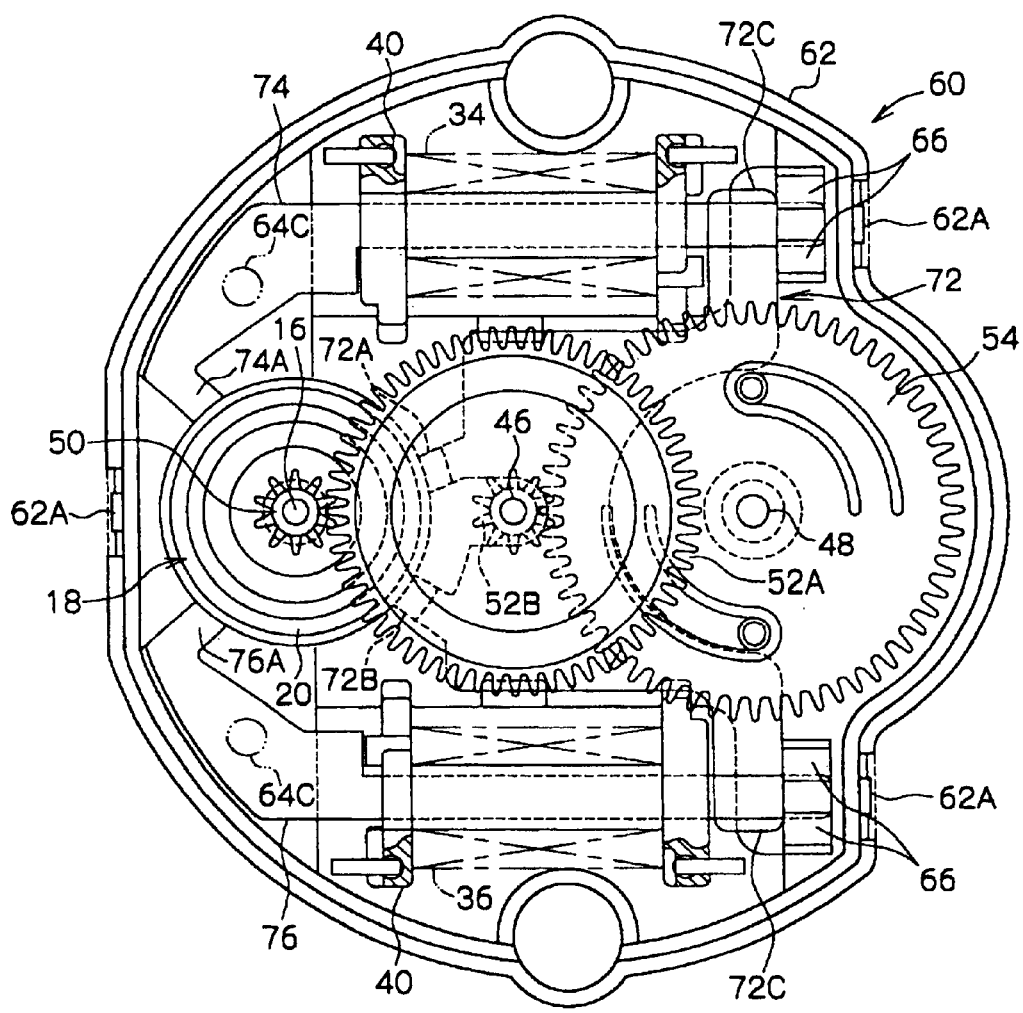
FIG. 9 is a plan view of the stepping motor according to the third embodiment of the present invention in a state that a cover is removed therefrom.

Then, as shown in FIG. 8 and FIG. 9, the middle gear 52 for reducing the rotation speed of the rotor 18 is rotatably arranged between the prime gear 50 and the output gear 54, similarly to the first embodiment. Further, in a part of the case body 62 facing the output gear 54, a receiving portion 62B for stably maintaining a position in an axis direction of the output gear 54 is formed in a ring shape. Furthermore, in a holding portion for the supporting axis 46 in the case body 62, a circular fitting portion 62C for securely fitting an end of the supporting axis 46 is provided in a protruding manner.

Figure 10:
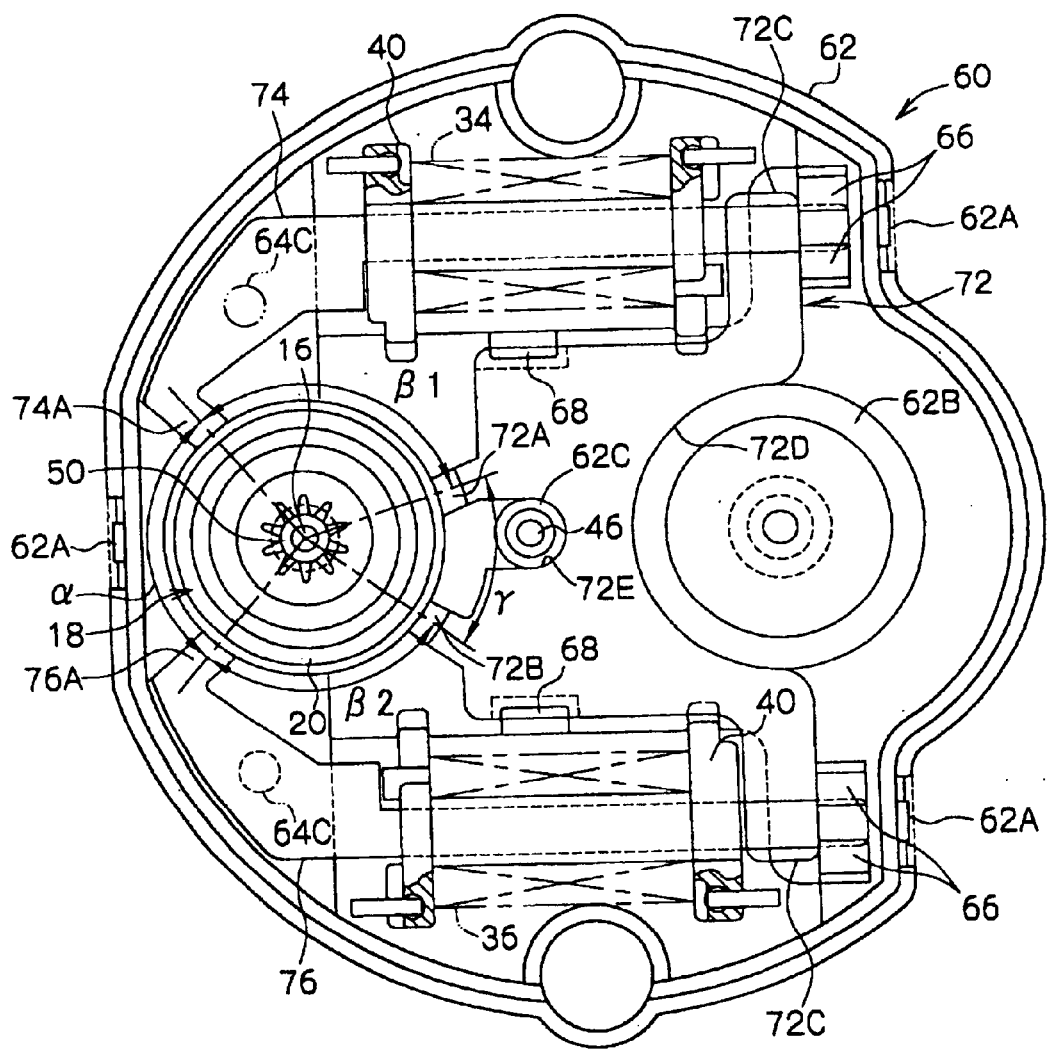
FIG. 10 is a plan view of the stepping motor according to the third embodiment of the present invention in a state that the cover and gears are removed therefrom.

Meanwhile, as shown in FIG. 8 and FIG. 10, in a part of a bottom of the case body 62 near the rotor 18, a stator base 72 formed in a plate and made of ferromagnetic material such as iron is fixed in a manner that its one end side faces the rotor 18.

Left and right parts of base end sides of the stator base 72 have leg portions 72C which extend to the left and to the right respectively. The pair of leg portions 72C respectively abut to root parts of pairs of yoke fixing hooks 66 which are formed to protrude from the case body 62 so that the stator base 72 is positioned in the case body 62. The middle part of the stator base 72 also engages with two stator fixing hooks 68 which are formed to protrude from the case body 62 so that the stator base 72 is fixed to the case body 62.

In addition, at the midsection of the base end side of the stator base 72, a recess 72D is formed in a manner of avoiding the receiving portion 62B which is a supporting portion for the output gear 54. Moreover, also at the midsection of the front end side of the stator base 72, a recess 72E is formed in a manner of avoiding the fitting portion 62C for the supporting axis 46 which is a supporting portion for the middle gear 52.

On the other hand, a pair of stator magnetic polar portions 72A and 72B are provided in the parts of the frond end side of the stator base 72 in a manner that protruding portions which protrude from the frond end side of the stator base 72 in directions orthogonal to the axis direction of the rotor 18 are bent upward in a vertical direction with respect to a surface of the stator base 72. In addition, the angle γ around the center of the rotor 18 between the pair of stator magnetic polar portions 72A and 72B shown in FIG. 10 is an angle of 54°.

Further, a pair of magnetic yokes 74 and 76 each of whose base end sides is formed in a linear shape pass through the through holes 40A of the bobbins 40 respectively. Thus, the pair of coils 34 and 36, which are the excitation coils wound around the bobbins 40, are mounted on the pair of magnetic yokes 74 and 76 so that the pair of coils 34 and 36 are fixed to the pair of magnetic yokes 74 and 76. However, the front end sides of the pair of magnetic yokes 74 and 76 are formed in a curved shape.

Ends of the base end sides of the pair of magnetic yokes 74 and 76, which respectively penetrate the bobbins 40, are tightly held by the pairs of yoke fixing hooks 66 respectively. Thus, the base end sides of the pair of magnetic yokes 74 and 76 abut to the pair of leg portions 72C of the stator base 72 respectively from the upper part. As a result, the base end sides of the pair of magnetic yokes 74 and 76 are set on the stator base 72 and fixed to a bottom side of the case body 62 so that magnetic paths can be formed respectively.

Figure 11:
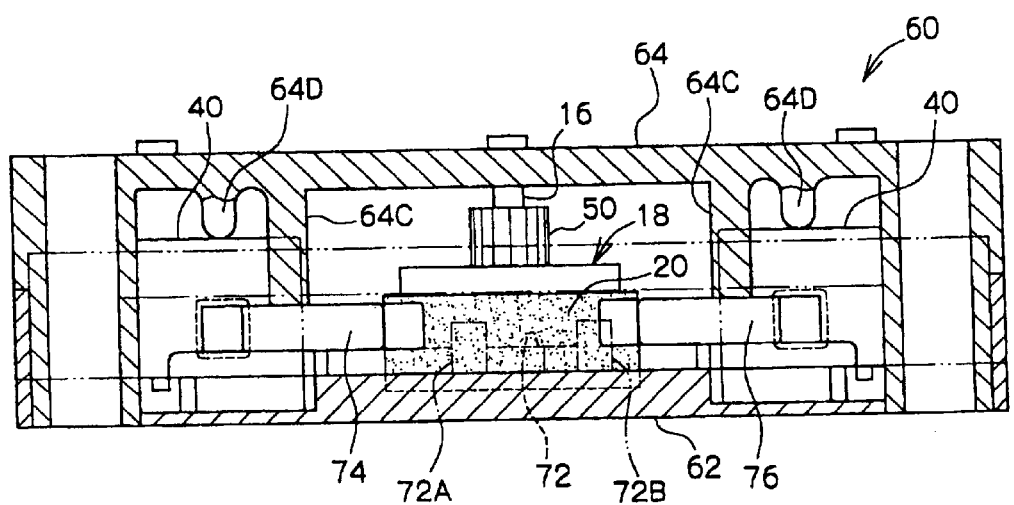
FIG. 11 is a sectional view near a rotor of the stepping motor according to the third embodiment of the present invention.

Moreover, as shown in FIG. 11, the front end sides of the pair of magnetic yokes 74 and 76 are respectively pushed and fixed to the bottom side of the case body 62 by pins 64C protruding downward from the cover 64. Furthermore, flange portions of the pair of bobbins 40 around which the coils 34 and 36 are wound are also respectively pushed and fixed to the bottom side of the case body 62 by convexes 64D protruding downward from the cover 64.

Accordingly, the base end sides of the pair of magnetic yokes 74 and 76 are fixed at positions in the case body 62 with the stator base 72 therebetween in a manner that their longitudinal directions are parallel to each other.

As a result of above description, although the pair of stator magnetic polar portions 72A and 72B are integrally formed with the stator base 72 and separately structured from the magnetic yokes 74 and 76, the base end sides of the pair of magnetic yokes 74 and 76 are set on the stator base 72 so that the magnetic paths can be formed.

In addition, front end portions 74A and 76A, which are respectively ends of front end sides of the pair of magnetic yokes 74 and 76 formed in the curved shape, are respectively arranged outside narrow space sandwiched between the pair of stator magnetic polar portions 72A and 72B, different from the first embodiment.

However, the stator magnetic polar portion 72A is arranged so that an angle β1 between the front end portion 74A of the magnetic yoke 74 and the stator magnetic polar portion 72A around the center of the rotor 18 shown in FIG. 10 is an angle of 117°. Further, the stator magnetic polar portion 72B is arranged so that the an angle β2 between the front end portion 76A of the magnetic yoke 76 and the stator magnetic polar portion 72B around the center of the rotor 18 is an angle of 99°. Accordingly, an angle α between the front end portions 74A and 76A of the pair of magnetic yokes 74 and 76 around the center of the rotor 18 is 90°.

As described above, the front end portions 74A and 76A of the pair of magnetic yokes 74 and 76 and the pair of stator magnetic polar portions 72A and 72B are arranged radially around the center of the rotor 18. Further, the aforesaid pair of coils 34 and 36 are connected to the not-shown control circuit, and currents are supplied from the control circuit. However, the currents respectively include the drive pulses which are generated at the predetermined frequency and have predetermined phase difference from each other.

In response to these drive pulses, the pair of coils 34 and 36 excite the pair of magnetic yokes 74 and 76 respectively, and in this case, the stator magnetic polar portion 72A and the magnetic yoke 74 form a magnetic path through the stator base 72 while the stator magnetic polar portion 72B and the magnetic yoke 76 form a magnetic path through the stator base 72. As a result, the pair of magnetic yokes 74 and 76 and the pair of stator magnetic polar portions 72A and 72B are magnetized in sequence, and the rotor 18 rotates by the number of the pulses.

Subsequently, the operation of the stepping motor 60 according to this embodiment will be explained.

The stepping motor 60 according to the embodiment has a structure in which the stator base 72 is arranged near the rotor 18 which has the plurality of magnetic poles along its circumferential direction. Further, the stepping motor 60 also has a structure in which the base end sides of the pair of magnetic yokes 74 and 76 which are arranged to face the magnetic poles of the rotor 18 abut on the leg portions 72C of the stator base 72 respectively so that the magnetic paths can be formed respectively.

Moreover, as the drive pulses having the phase difference from each other are supplied from the control circuit to the pair of coils 34 and 36 which are mounted on the pair of magnetic yokes 74 and 76 respectively, the pair of coils 34 and 36 excite the pair of magnetic yokes 74 and 76 respectively. Then, the pair of stator magnetic polar portions 72A and 72B, which are integrally formed with the stator base 72 and separated from the magnetic yokes 74 and 76 respectively, form the magnetic paths together with the magnetic yokes 74 and 76 while being magnetized.

As a result, for example, when the currents including the drive pulses having the phase difference are supplied to the coils 34 and 36, the following happens.

Specifically, a magnetic path is formed from the base end side of the magnetic yoke 74 through the stator base 72 to the stator magnetic polar portion 72A adjacent to the front end portion 74A of the magnetic yoke 74, and these become a south pole or a north pole. On the other hand, having phase difference from this, a magnetic path is formed from the base end side of the magnetic yoke 76 through the stator base 72 to the stator magnetic polar portion 72B adjacent to the front end portion 76A of the magnetic yoke 76, and these become a south pole or a north pole.

Figure 12:
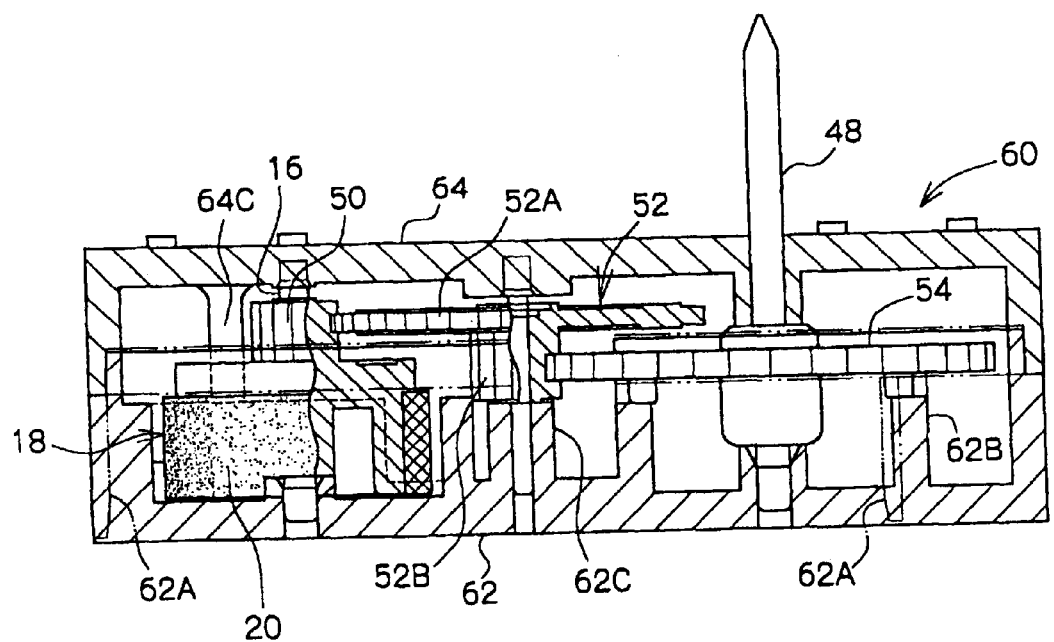
FIG. 12 is a sectional view showing engagement of the gears of the stepping motor according to the third embodiment of the present invention.
Figure 13:
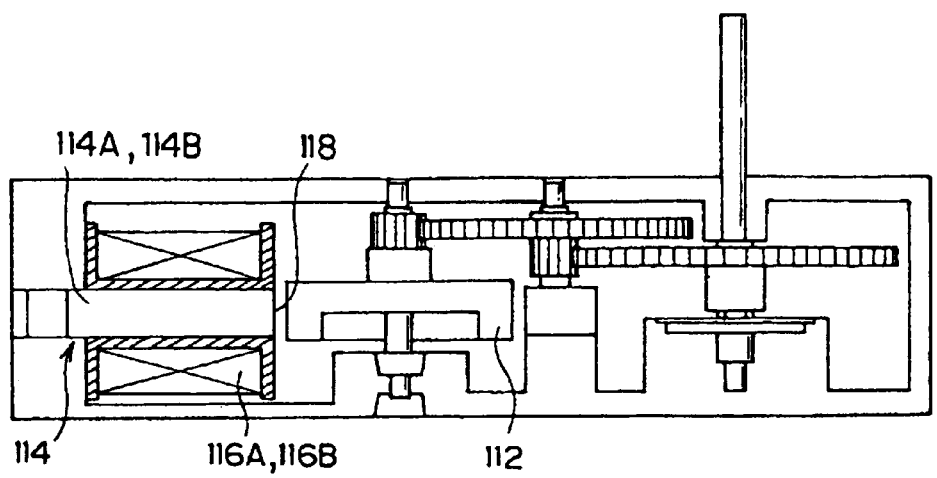
FIG. 13 is a sectional view showing a stepping motor in a first conventional art.
Figure 14:
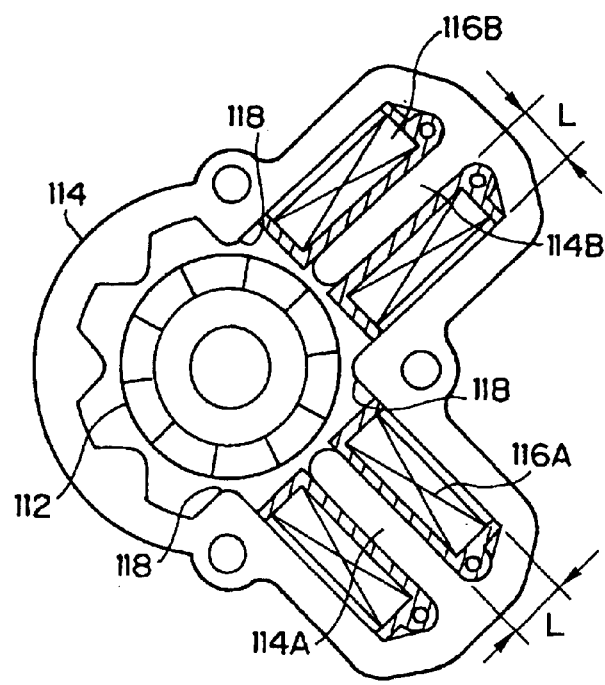
FIG. 14 is a sectional plan view showing the stepping motor in the first conventional art.
Figure 15:
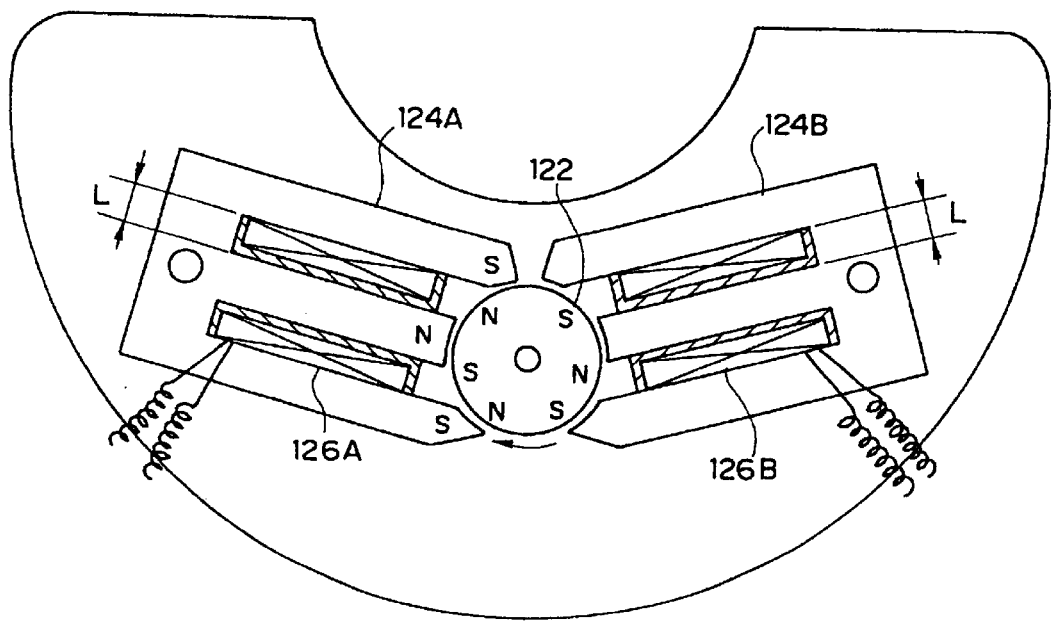
FIG. 15 is a sectional view showing a stepping motor in a second conventional art.

As described above, these magnetic paths cooperate with the magnetic poles of the permanent magnet 20 of the rotor 18, which allows the rotor 18 to perform the stepping operation in which the rotor 18 rotates in sequence, and the stepping operation is transmitted to the output gear 54 while its speed being reduced at the middle gear 52 shown in FIG. 12 and outputted to the outside of the stepping motor 60.

In this embodiment, as the stator magnetic polar portions 72A and 72B which form the magnetic paths together with the magnetic yokes 74 and 76 are formed separately from the magnetic yokes 74 and 76, the magnetic yokes 74 and 76 have a J-shape, which does not restrict the size of the coils 34 and 36.

As a result, different from the conventional magnetic yoke having the U- or W-shape, the restriction in arranging the coils 34 and 36 is reduced and the coils 34 and 36 can be wound by desirable turns without making their wire size smaller. Therefore, the currents to be supplied to the coils 34 and 36 are not restricted by the size of the magnetic yokes 74 and 76.

Accordingly, similarly to the first embodiment, the flexibility of resistance values of the coils 34 and 36 applied to the stepping motor 60 according to this embodiment greatly increases, which also improves the flexibility in designing a shape of the stepping motor 60.

As described above, also in this embodiment, it becomes possible to freely change the size of the coils 34 and 36 without upsizing the magnetic yokes 74 and 76, which enhances the assembly property and reliability of the stepping motor 60 while realizing the downsizing of the stepping motor 60.

In addition, similarly to the first embodiment, since the shape of the magnetic yokes 74 and 76 is simple, the process yields are improved. Further, since the shape of the magnetic yokes 74 and 76 is simple and its assembly can be mechanized, the reduction in the manufacturing cost can be also realized.

Aside from this, in this embodiment, the magnetic yokes 74 and 76 are formed separately from the stator base 72, and it becomes unnecessary to make material of the magnetic yokes 74 and 76 as the same material of the stator base 72 and stator magnetic polar portions 72A and 72B. Moreover, since the stator base 72 and the pair of stator magnetic polar portions 72A and 72B are integrally formed, the same operation and effects as those in the first embodiment can be realized.

Meanwhile, in this embodiment, the protruding portions protruding from the front end sides of the stator base 72 are respectively bent with respect to the surface of the stator base 72 so that the pair of stator magnetic polar portions 72A and 72B are formed.

In other words, by bending and forming the pair of stator magnetic polar portions 72A and 72B with respect to the surface of the stator base 72, a structure in which the whole surfaces of the bent stator magnetic polar portions 72A and 72B face the rotor 18 can be realized even when the stator base 72 is downsized, which makes it possible to obtain a large torque with lower current.

In addition, in this embodiment, the case body 62 for forming the outer frame of the stepping motor 60 and the cover 64 for closing the open end of the case body 62 are included. The connection hooks 62A provided on the cover 64 engage with the engaging pieces 64A provided on the case body 62 so that the cover 64 is mounted on the case body 62. Further, the stator fixing hooks 68 are provided in the case body 62 and the stator base 72 is fixed in the case body 62 by the stator fixing hooks 68.

In other words, in assembling the stepping motor 60, the cover 64 is mounted on the case body 62 only by engaging the engaging pieces 64A and the connecting hooks 62A. Moreover, only by pushing the stator base 72 into the case body 62, front end sides of the stator fixing hooks 68, which are once elastically deformed, return to the original conditions and the stator base 72 engages with the stator fixing hooks 68 so that the stator base 72 is fixed to the case body 62. Therefore, the manufacturing steps for the stepping motor 60 are simplified and the manufacturing cost for the stepping motor 60 can be further reduced.

In addition, in this embodiment, the gears composed of the prime gear 50, middle gear 52, output gear 54, and the like for reducing the rotation speed of the rotor 18 are arranged in the case body 62, and the recesses 72D and 72E for avoiding the supporting portions of the gears are provided in the stator base 72. Moreover, the base end sides of the magnetic yokes 74 and 76 on which the pair of coils 34 and 36 are mounted are formed in the linear shape as well as the front end sides of the magnetic yokes 74 and 76 which face the rotor 18 are formed to be curved.

In other words, as thus shaped, the recesses 72D and 72E for avoiding the supporting portions of the gears are provided in the stator base 72, and the gears for reducing the rotation speed of the rotor 18 and the stator base 72 can be arranged in the case body 62 without interfering with each other. In addition, the magnetic yokes 74 and 76 are formed in the J-shape as described above, which makes it possible to give the flexibility to the arrangement of the magnetic yokes 74 and 76 irrespective of the arrangement of the front end portions 74A and 76A while allowing the coils 34 and 36 to be easily mounted on the magnetic yokes 74 and 76.

As a result, it becomes possible to realize further downsizing of the stepping motor 60.

Incidentally, although the permanent magnet has 10 magnetic poles in the aforesaid embodiments, the number of the magnetic poles may be other plural number than 10. A desirable number of the magnetic poles is 6 or more for the smooth movement of the rotor, and a more preferable number of the magnetic poles is 8 or more for the smooth movement of the rotor. On the other hand, an upper limit to the number of the magnetic poles of the permanent magnet is considered as approximately 20 from the viewpoint of manufacturing.

Further, in the aforesaid first and second embodiments, two angles β between the magnetic yokes and the stator magnetic polar portions around the center of the rotor exist and the angles β1 and β2 are equal to each other, but the stator magnetic polar portions may be arranged in the manner that the angles are different from each other as in the third embodiment.

Furthermore, as material of the magnetic yokes, for example, perm alloy having permeability of 10000 to 15000 can be considered to apply, and as material of the stator base, for example, metallic material such as a cold rolled steel plate having permeability of approximately 1000 can be considered to apply.

The stepping motor according to the present invention makes it possible to freely change the number of turns of excitation coils without upsizing the magnetic yokes as well as to enhance the assembly property and reliability. Further, the stepping motor according to the present invention enables the smooth operation.

What is claimed is:

1. A stepping motor comprising:
    a rotor having a plurality of magnetic poles along its circumferential direction;
    one stator base arranged near the rotor;
    a pair of magnetic yokes fixed on the stator base and arranged to face the magnetic poles of the rotor;
    a pair of excitation coils mounted on the pair of magnetic yokes respectively and exciting the pair of magnetic yokes respectively in response to drive pulses which have phase difference; and
    a pair of stator magnetic polar portions integrally formed with the stator base, for forming magnetic paths together with the magnetic yokes respectively,
    wherein,
        when an angle between the pair of magnetic yokes around a center of the rotor is α, angles between the pair of magnetic yokes and the stator magnetic polar portions are β1 and β2 respectively, and an angle between the pair of stator magnetic polar portions is γ,
        and if a number of magnetic poles of the rotor is N, K is an integer, a is an odd number, and b is 0 or 1, each of the angle α and angles β1 and β2 is less than 180° and obtained from formulas of $$\alpha = (K+0.5) \times 360/N$$

$$\beta1, \beta2 = (a \pm b/4) \times 360/N$$

$$C = \gamma \times N/360$$

where the angle α and angles β1 and β2 are controlled so that C is not an integer.

2. The stepping motor according to claim 1,
wherein the number N of magnetic poles of the rotor is in a range of 6 to 20.

3. The stepping motor according to claim 1,
wherein a center portion of the rotor is formed of resin material and formed integrally with a gear, and an outer circumferential side of the rotor is formed by a permanent magnet.

4. The stepping motor according to claim 1,
wherein the stator base is formed of ferromagnetic material.

5. The stepping motor according to claim 1,
wherein each of the pair of magnetic yokes is formed in a linear shape, base end sides of the magnetic yokes are fixed on the stator base, and front end sides of the magnetic yokes are arranged to face the rotor.

6. The stepping motor according to claim 1,
wherein front end sides of the pair of magnetic yokes are formed in a J-shape, and the front end sides are arranged to face the rotor.

7. The stepping motor according to claim 1,
wherein the pair of stator magnetic polar portions are formed in a manner in which portions protruding from the stator base are respectively bent with respect to a surface of the stator base.

8. The stepping motor according to claim 1,
wherein permeability of material composing the pair of magnetic yokes is higher than permeability of material composing the stator base.

* * * * *